Jan. 3, 1933.  R. H. GAMBLE ET AL  1,893,201
MATCH PACKAGING MACHINE
Filed July 7, 1930    8 Sheets-Sheet 1
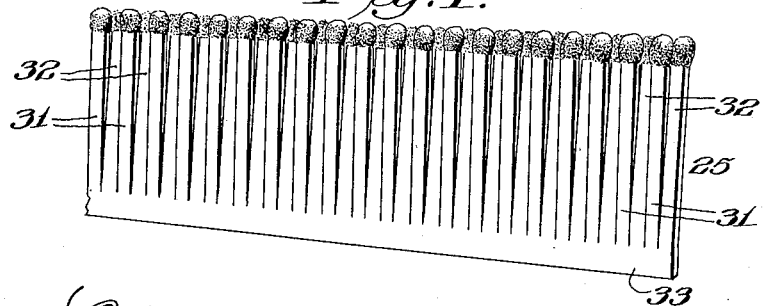
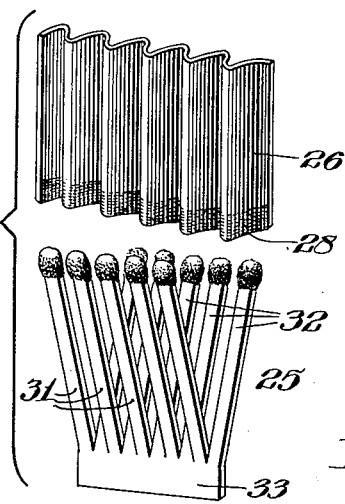
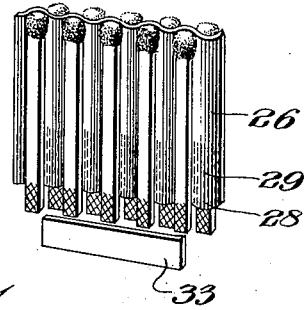
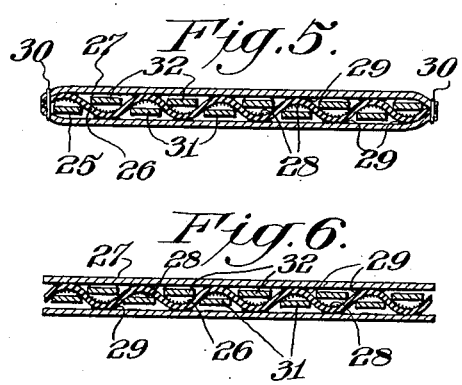
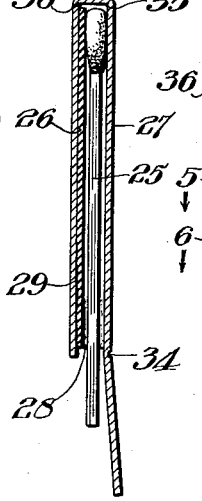
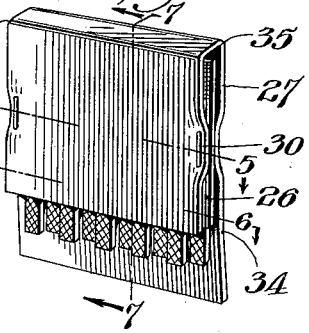
Inventors
Ralph H. Gamble and
William J. Crowell, Jr.,
By
W. Steell Jackson
Attorney.

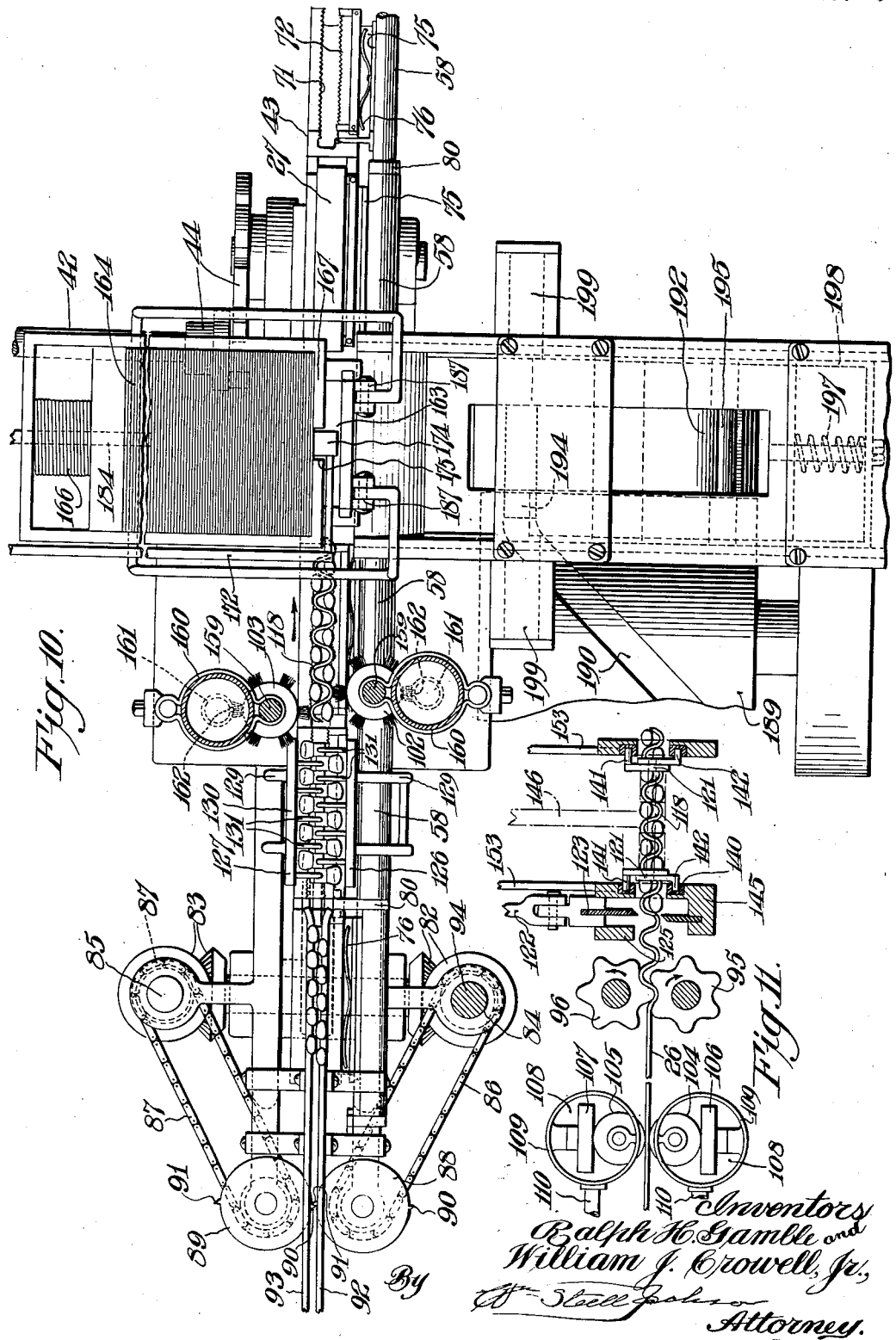

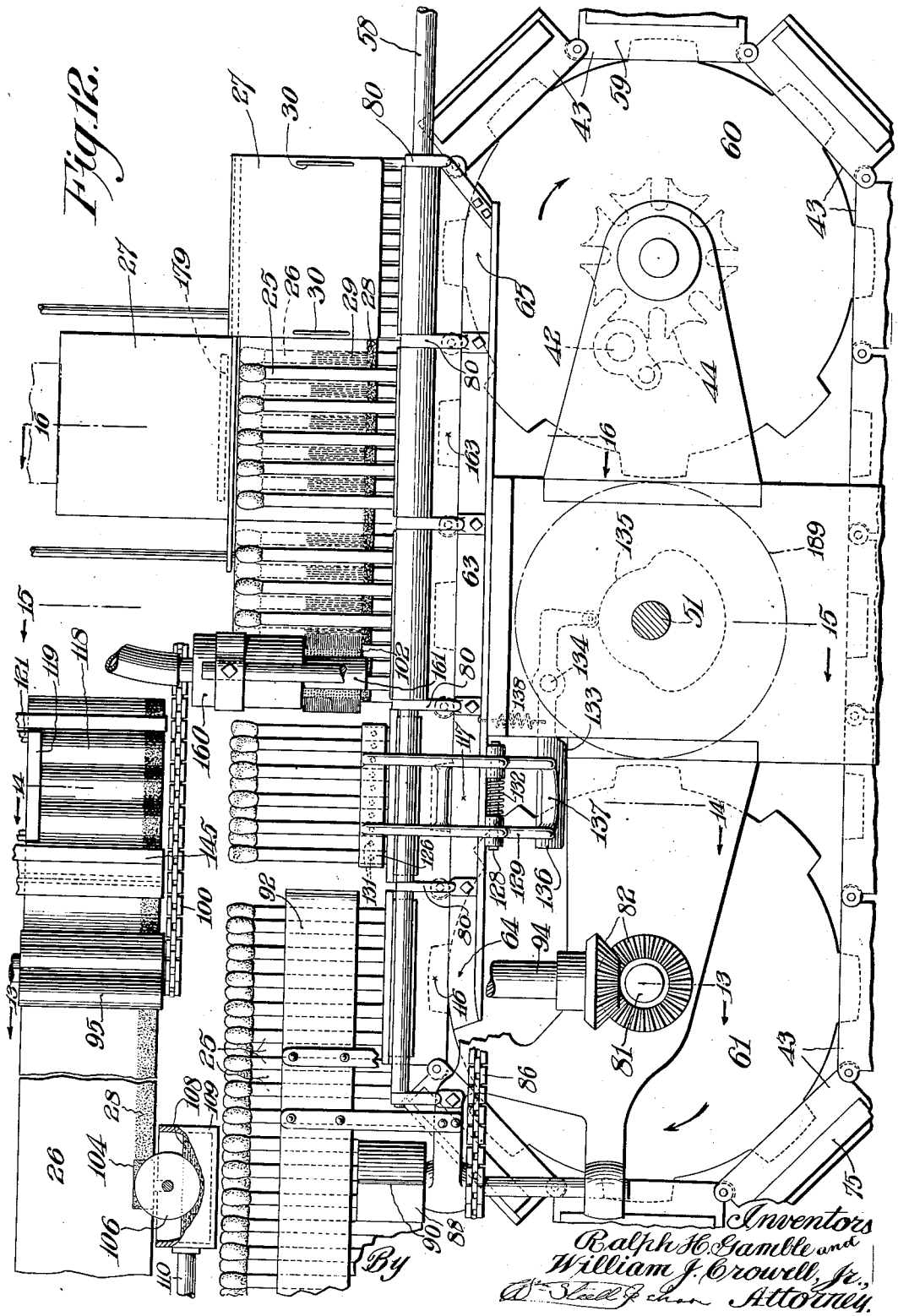

Jan. 3, 1933.  R. H. GAMBLE ET AL  1,893,201
MATCH PACKAGING MACHINE
Filed July 7, 1930   8 Sheets-Sheet 5
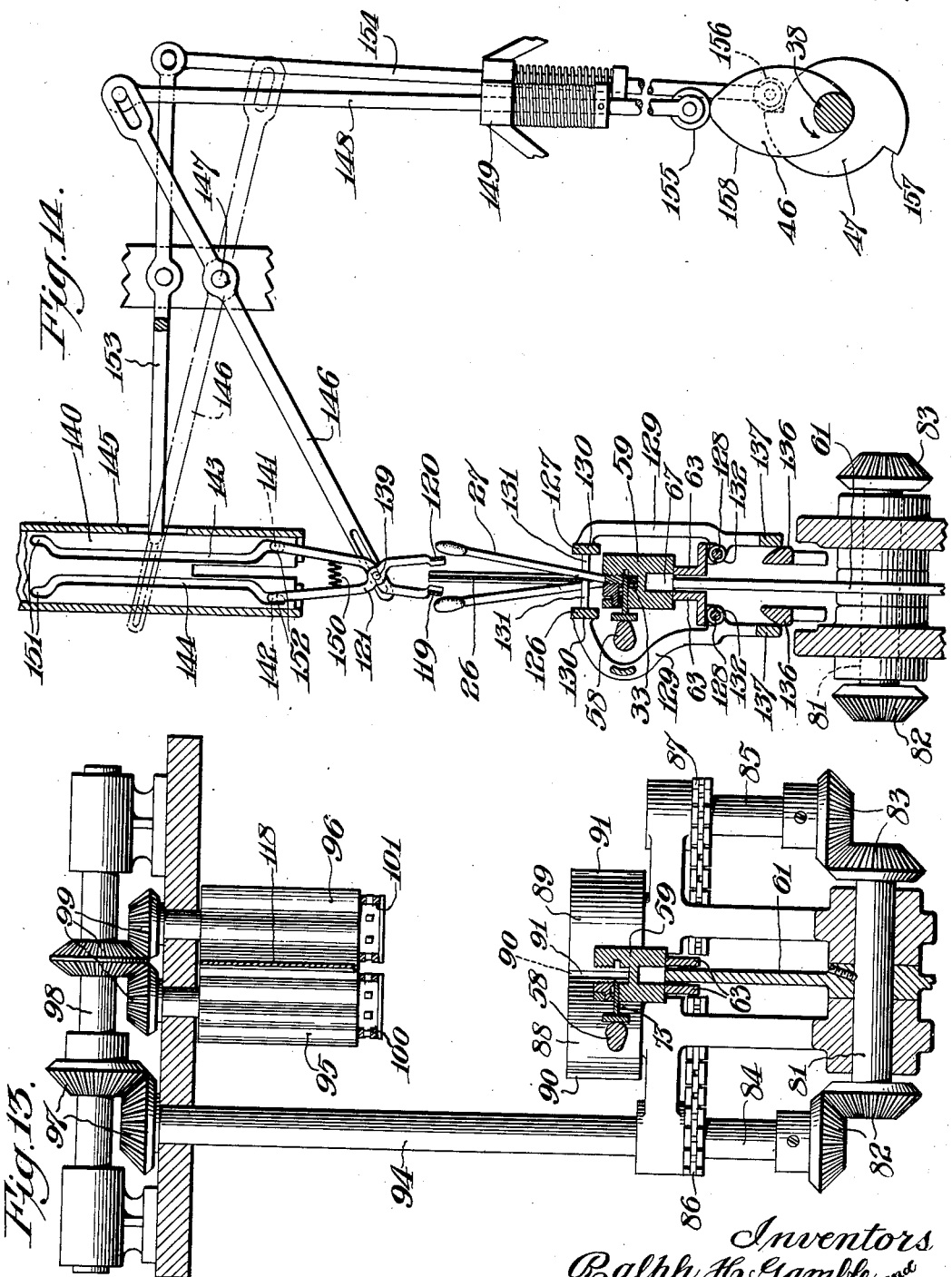

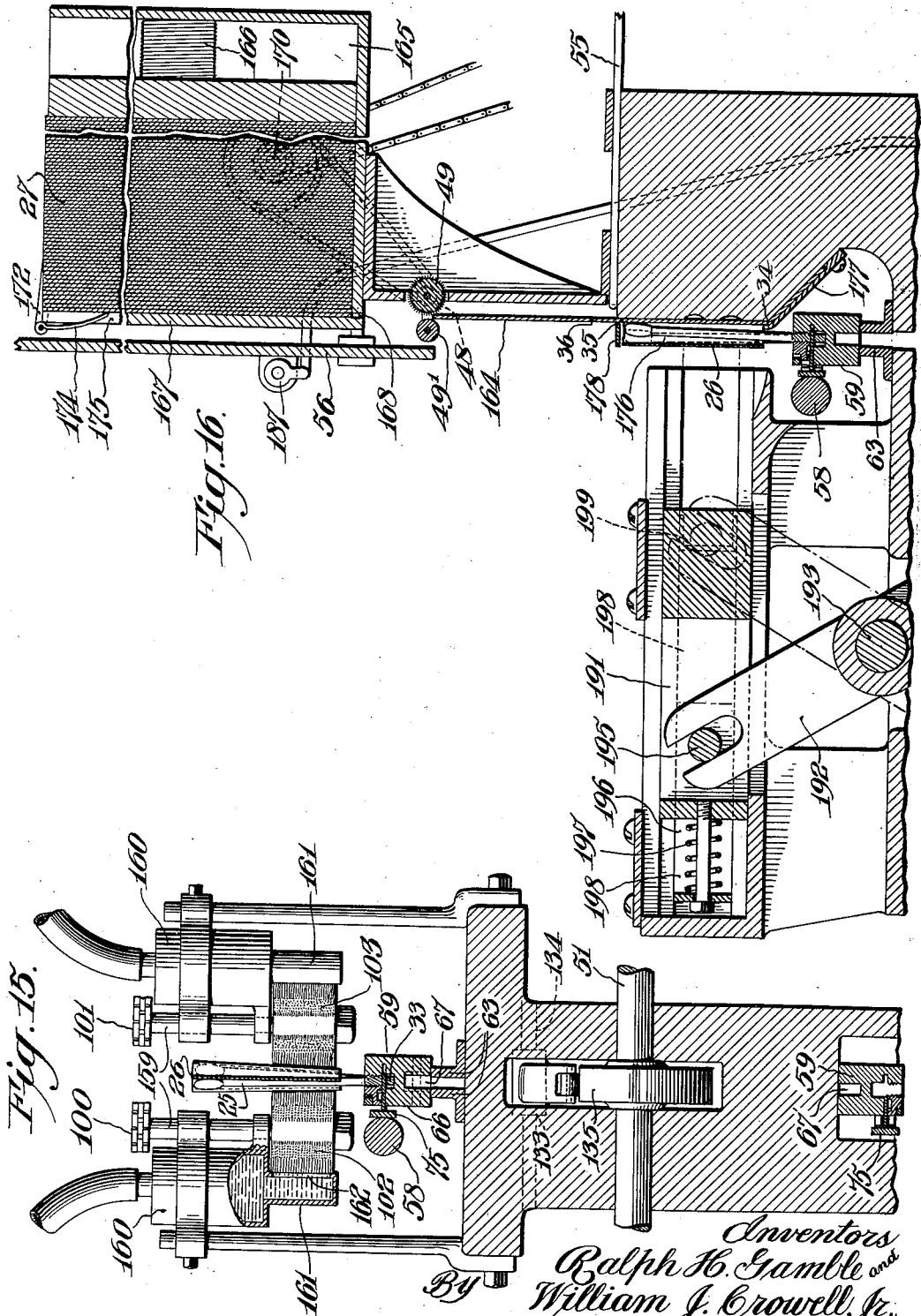

Jan. 3, 1933. R. H. GAMBLE ET AL 1,893,201
MATCH PACKAGING MACHINE
Filed July 7, 1930  8 Sheets-Sheet 7
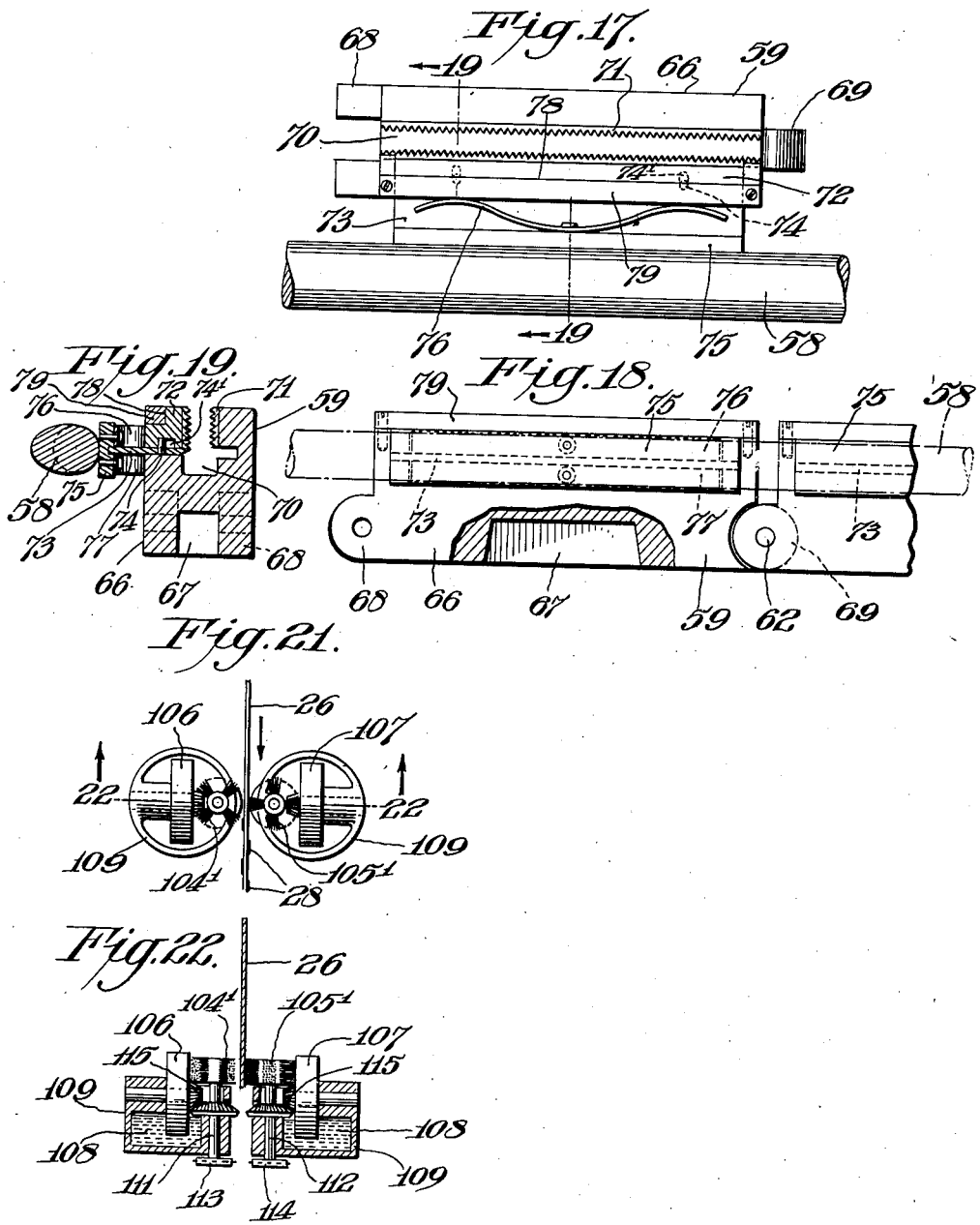

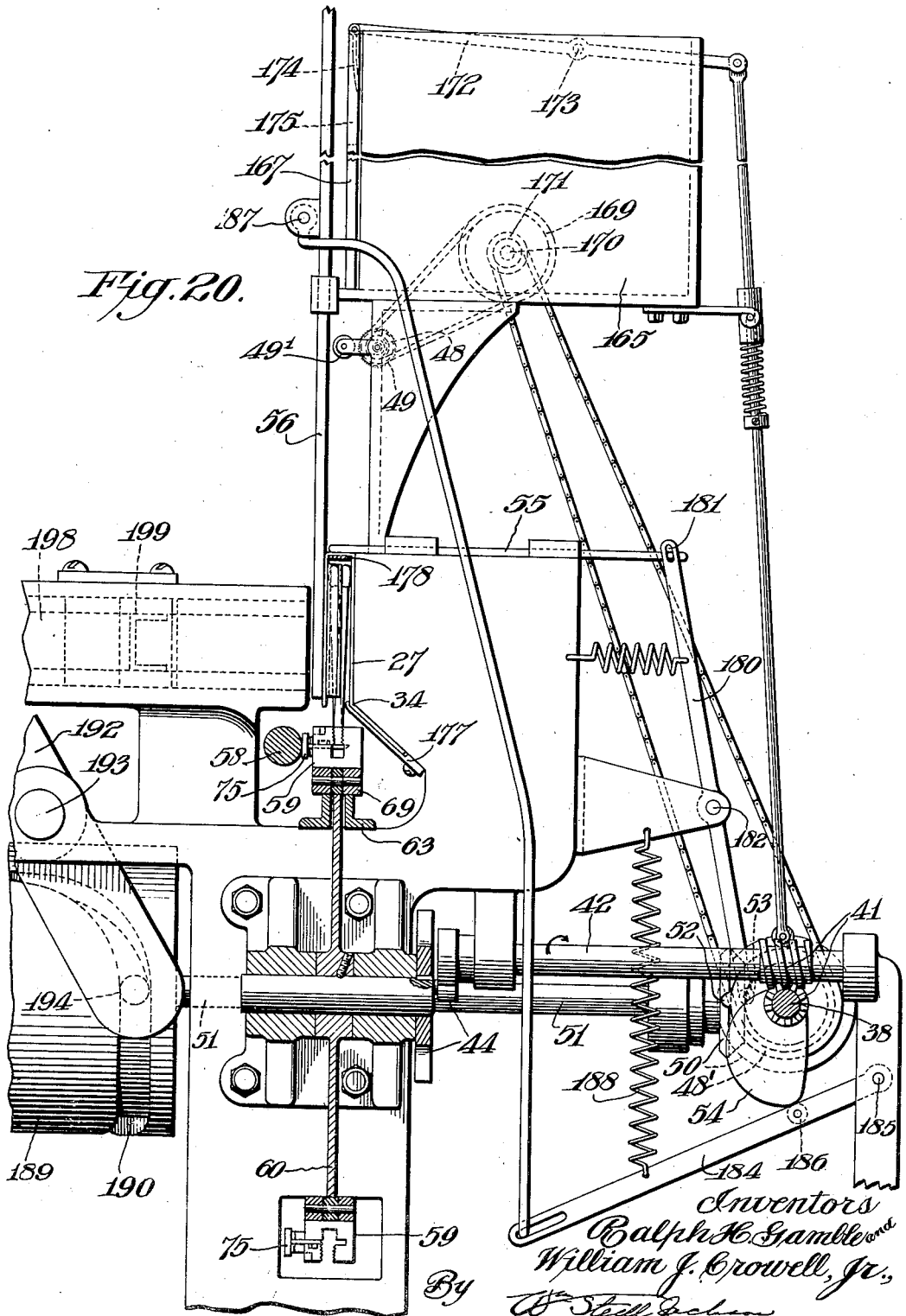

Patented Jan. 3, 1933

1,893,201

UNITED STATES PATENT OFFICE

RALPH H. GAMBLE, OF MOORESTOWN, NEW JERSEY, AND WILLIAM J. CROWELL, JR., OF WYNCOTE, PENNSYLVANIA, ASSIGNORS TO PULLENLITE COMPANY, OF PHILADELPHIA, PENNSYLVANIA, A CORPORATION OF PENNSYLVANIA

MATCH PACKAGING MACHINE

Application filed July 7, 1930. Serial No. 465,987.

Our invention relates to a machine adapted to manufacture packets of paper matches of a general type disclosed herein.

A purpose of our invention is to provide a machine of the character indicated that is adapted to easy and inexpensive manufacture and that is well suited to perform the intended service.

A further purpose is to apply ignition material and glue to the vertical end faces of axially horizontal dip rolls in order to transfer the material to axially vertical applying rolls for transfer to horizontally moving vertical strips of corrugated paper engaged by the rolls.

A further purpose is to assemble a strip of corrugated paper with the matches of a strip of paper matches by feeding the two strips forward to rest positions in the same vertical plane with the strip of paper vertically above the upwardly directed head ends of the matches, then spreading the matches and moving the paper strip downward.

A further purpose is to laterally spread the rows of alternate matches of a paper strip at the head ends thereof and to insert a corrugated strip of paper between the spreading rows seating the matches of each row in the corrugations of the strip.

A further purpose is to provide means for simultaneously holding and roughening the shank ends of paper matches, holding the matches at their shank ends for presentation of the matches to operating members of the packeting machine and using the firmness of the gripping to effect the desired roughening.

A further purpose is to make a match gripping member as a resilient follower of a knife for cutting the matches from the strip, thereby adapting the holding member to operate during the reciprocating stroke of the knife.

A further purpose is to operate a knife and gripping mechanism for cutting and holding the lower portions of match strip sections on the individual blocks of an intermittently movable conveyor by means of a cam along side of the conveyor, operating simultaneously at a plurality of successive blocks during both rest and movement periods of the conveyor.

A further purpose is to provide desirable mechanism for automatically placing a paper strip between the spread rows of alternate matches of a strip of matches.

A further purpose is to provide desirable means for applying glue to outwardly presented surfaces of the corrugations of a corrugated strip of paper in order to have the corrugated strip present a glue coated surface to a cover sheet.

A further purpose is to provide desirable means for placing a cover upon a partially formed packet.

A further purpose is to provide desirable means for stapling the cover after it has been applied.

Further purposes will appear in the specification and in the claims.

We have preferred to illustrate one main form only of our invention, both with respect to the packet and with respect to our mechanism for assembling the packet, showing however modified forms of minor details and selecting a main form that is practical and efficient in operation and which well illustrates the principles involved.

Figure 1 is a perspective view of a strip of paper matches as fed into the machine.

Figure 2 is a perspective view showing severed sections respectively of the match strip of Figure 1, and of a corrugated paper strip intended to be inserted between spaced rows of the alternate matches of the match strip, showing the rows of alternate matches spread to receive the separating strip of corrugated paper, being a view illustrating the relative positions of the matches and corrugated strip preparatory to their assembly.

Figure 3 is a perspective view with the corrugated paper inserted in place between the matches, with the matches closed upon the corrugations, glue applied to the corrugated paper, the shank ends of the matches roughened and severed from the base strip, the severed base strip being shown still adjacent the match ends.

Figure 4 is a perspective view of the finished packet, being the structure of Figure 3 with an outer cover.

Figures 5, 6 and 7 are enlarged sections of Figure 4 taken respectively upon the lines 5—5, 6—6 and 7—7 thereof.

Figure 8:
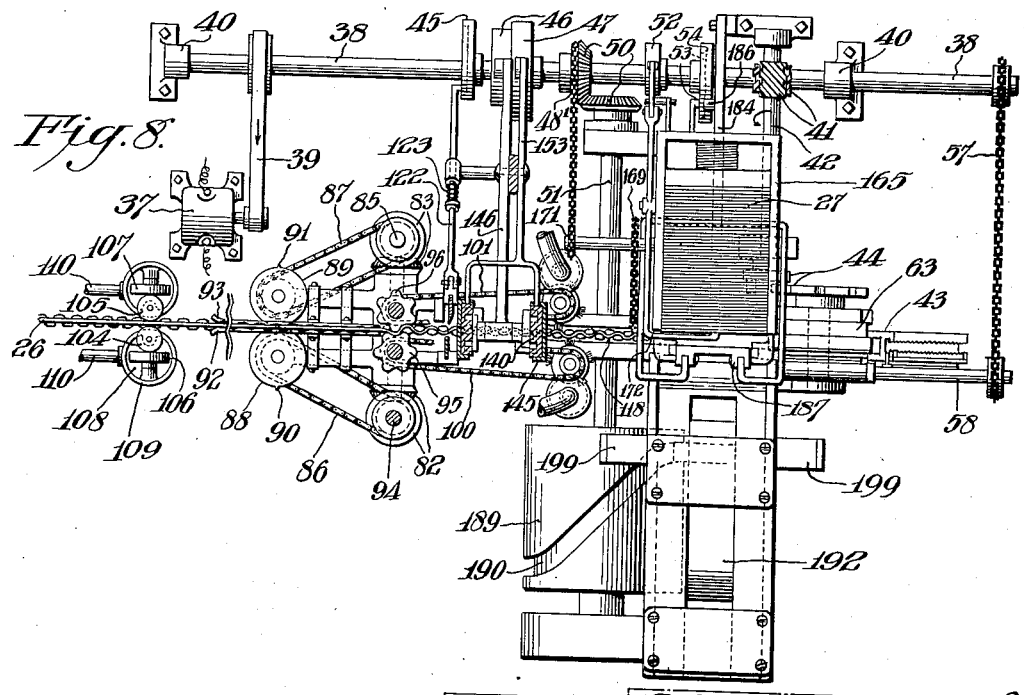
Figure 9:
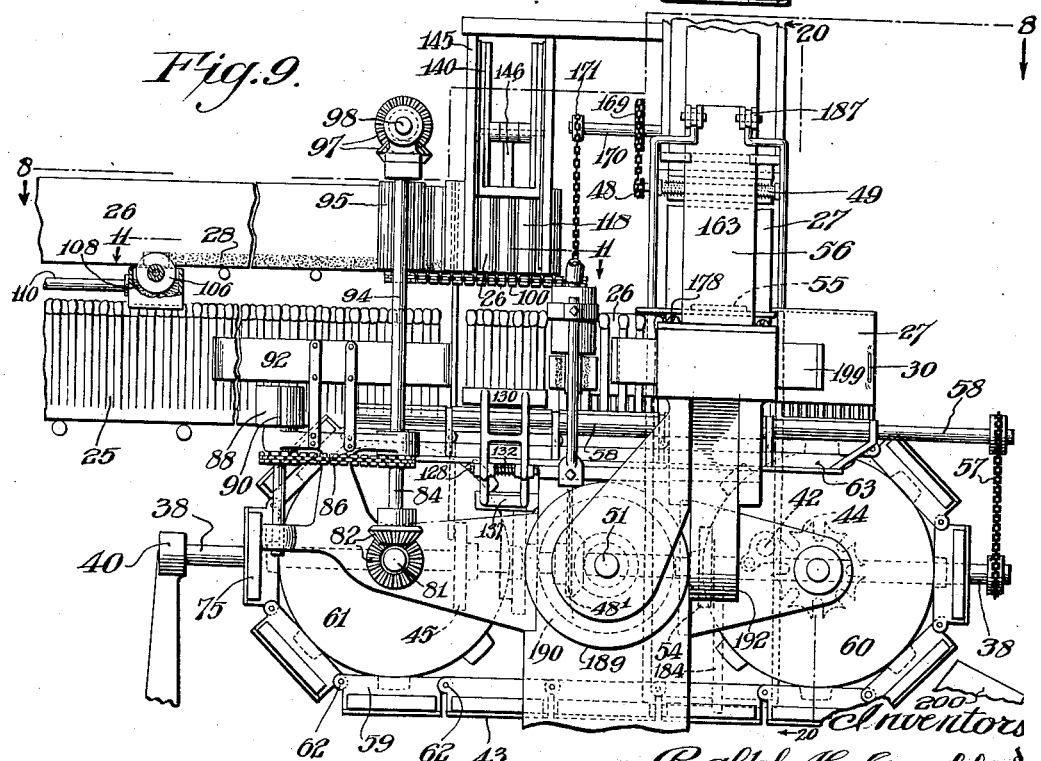

Figure 8 is a plan view of an entire machine embodying a desirable form of our invention, some of the parts being omitted and the view corresponding to a section taken upon the line 8—8 of Figure 9.

Figure 9 is a side elevation of Figure 8.

Figure 10 is an enlarged plan view of part of the machine, corresponding to a portion of Figure 8 showing parts not shown in Figure 8 and omitting some parts shown in Figure 8.

Figure 11 is an enlarged sectional plan view taken on the line 11—11 of Figure 9.

Figure 12 is an enlarged side elevation of mechanism generally illustrated in Figure 9, certain of the parts having been omitted for clearness.

Figure 13 is a section on the line 13—13 of Figure 12.

Figure 14 is a section on the line 14—14 of Figure 12.

Figure 15 is a section on the line 15—15 of Figure 12.

Figure 16 is a section on the line 16—16 of Figure 12.

Figure 17 is a plan view of a gripping element.

Figure 18 is a partly broken side elevation of structure of Figure 17.

Figure 19 is a section taken upon the line 19—19 of Figure 17.

Figure 20 is a vertical section taken upon the line 20—20 of Figure 9 and showing trip mechanism.

Figure 21 is a view corresponding to a modified fragment of Figure 8 showing an alternative form of mechanism for applying striking material.

Figure 22 is a vertical section taken upon the line 22—22 of Figure 21.

Like numerals refer to like parts in all figures.

Describing in illustration and not in limitation and referring to the drawings:—

One form of finished packet adapted to be manufactured by mechanism embodying a desirable form of our invention, with the materials used in its manufacture, are illustrated in Figures 1 to 7 inclusive, Figure 4 showing a finished packet in perspective.

The raw materials from which the packets are made comprise paper match strip 25, paper strip 26 and cover blanks or wraps 27 with also suitable striking material 28, adhesive material 29 and staples 30.

The paper is transversely corrugated either during or before the process of manufacture, and coated intermittently or continuously along opposite sides of one edge with ignition material 28.

The rows 31 and 32 of alternate matches, Figure 2, are spread apart from the connecting strip of paper 33 along the shank ends of the match strip and the corrugated paper 26 is inserted between the spreading rows 31 and 32 so that the matches of the rows fit in the corrugations upon opposite sides of the strip as seen in Figure 3, the connecting portion 33 of the strip being cut away before or during the insertion of the paper 26 intermediate the rows of alternate matches.

The intermediate strip 26, already coated with the ignition material 28, is then coated with adhesive 29 on each side intermediate the matches and a cover 27 is applied over the packet covering the head ends of the matches.

The glue may be applied over the ignition material and for some little distance further toward the head side of the packet than the ignition material and on the outside of the corrugations.

The covers 27 comprise paper sheets or paper boards suitably scored at 34, 35 and 36 and fit the packet as best seen in Figure 7 bending sharply at the score lines 35 and 36 and readily bending at 34 for more easy access to the shank ends of the matches.

The wrap or cover is held to the corrugated paper by staples 30 at opposite sides of the packet, and by the adhesive material 29 on the corrugated paper 26 intermediate the matches.

The packet as well as the assembled strips of matches and intermediate corrugated paper may be of any desired lengths.

The mechanism selected to embody the portion of our invention that relates to a machine for manufacturing our packet is illustrated in Figures 8 to 22 inclusive with the parts being shown more or less diagrammatically in order to more clearly illustrate the principles involved and with many of the parts that would appear in the actual machine either omitted or shown in exaggerated scale or in modified forms for the same reason.

In the illustration, a motor 37 drives a main cam and drive shaft 38 by a suitable belt and pulley connection 39.

The main shaft 38 turns in bearings 40, has spiral gear connection 41 with a transverse shaft 42 that operates an intermittent conveyor 43 by means of suitable Geneva mechanism 44 intended to represent diagrammatically any suitable intermittent drive mechanism.

The main shaft carries a cam 45 for operating mechanism for cutting sections from the corrugated strip 26, cooperating cams 46 and 47 for operating mechanism placing the severed section of the strip 26 between the spread rows of matches and a sprocket wheel 48 for operating a continuous roll 49 used in assembling the covers 27 on the assembled match and corrugated strips 25 and 26.

The main shaft has also a bevel gear connection 50 with a shaft 51 operating stapling mechanism, and carries cams 52, 53 and 54 that respectively operate a feed of the wraps to the roll 49, and plungers 55 and 56 that respectively turn the wrap at the score lines 35 and 36.

The main shaft 38 also has sprocket chain connection at 57 with an auxiliary cam shaft 58 which serves to operate gripping and cutting members upon the individual link blocks 59 of the conveyor 43.

The conveyor 43, best seen in Figures 8, 9, 10, 12, 13, 14, 16 and 20, includes horizontally spaced sprocket wheels 60 and 61 and a sprocket chain actuated by the wheels and made up of a succession of links or blocks 59 pivotally connecting together at 62.

One of the sprocket wheels is provided with an intermittent drive 44 from the main cam shaft so that the conveyor has intermittent periods of rest and movement.

The links or blocks 59 are all alike and are led along a stationary guideway 63 that maintains the blocks in horizontal alinement intermediate the points 64 and 65, Figure 12, vertically above the wheel axes, the conveyor moving in the direction of the arrow, Figure 10.

Each block, as best seen in detail in Figures 17, 18 and 19, includes a body 66, recessed at 67 to receive a tooth of the sprocket wheel, is formed at the ends at 68 and 69 to pivotally connect with front and rear ends of adjoining blocks and carries gripping and cutting mechanism for use in holding the match strip by the shank ends of the individual matches during different phases of manufacture, in roughening the shank ends of the matches and in cutting the continuous portion 33 from the match strip.

The block is centrally recessed or grooved at 70 along its upper side and on one side of the recess carries a jaw member 71 integral with or rigidly fastened to the body of the block, laterally movable jaw and knife members 72 and 73 which are adapted to slide laterally with respect to the body of the block and with respect to one another, spaced pins 74 of the knife extending upward into short lateral slots 74' of the knife.

The knife blade carries a vertical flange or vertical strip 75 along its outer edge, the strip or flange 75 forming a rigid portion of the knife member and carrying inwardly directed springs 76 and 77 that respectively engage the movable jaw member 72 and the block body.

The spring 77 is adequately stronger than the springs 76 so that the knife is normally retracted outwardly until stopped by simultaneous engagements between the knife and movable jaw at the pins and slots 74 and 74' and between outward and inwardly directed surfaces at 78 between a rigid portion 79 of the body and the movable jaw 72.

It will be seen that the knife member is strongly spring pressed toward open position by the spring 77 and that when opened holds the jaw member open by reason of the engagement between the pins 74 with the outer ends of the slots 74'.

It will also be seen that the jaw member is spring pressed inwardly with respect to its mount so that when the knife is moved inwardly upon a match strip between the open jaws by the cam shaft 58, the jaw comes to rest in spring gripping the strip and permits the knife to move further inward to effect cutting and during this period maintains a suitably strong spring grip upon the match ends.

The cam member 58 comprises a rotating shaft which is continuously driven from the main shaft 38 by the sprocket chain connection at 57 and is supported at intervals along its length in suitable bearings 80, the cam shaft rotating synchronously with operations of the machine and presenting its cam surface to the outside of the knife member during both rest and movement periods of the block, and being formed to operate the jaw and knife during a rest period and to maintain gripping of the jaw member irrespective of movement of the block.

A shaft 81 of the conveyor sprocket wheel 61 (Figure 13) has bevelled gear connections at opposite ends at 82 and 83 respectively with vertical shafts 84 and 85 that make sprocket wheel connections at 86 and 87 with cooperating rollers 88 and 89 for use in advancing the match strip during the advancing movement of the conveyor.

The rolls 88 and 89 may desirably be provided with cooperating knife members 90 and 91 (Figures 8, 9, 10, 12 and 13) which serve to transversely cut the lower portion 33 of the strip as fed into the machine, in order to separate the length of the match strip for the packet.

The match strip before reaching the rolls 88 and 89 and for some distance beyond the rolls passes between laterally resilient vertical guides 92 and 93 that are somewhat above the rolls; the cut section is advanced after the cutting for some little distance between these guides by being pushed forward by the next section until the rolls come to rest at the rest period of the conveyor.

The shaft 84 is extended upward at 94, Figure 13, to operate the corrugating rolls 95 and 96, making bevel connection at 97 with a transverse shaft 98 that in turn makes bevel connections 99 with the corrugating rolls.

The corrugating rolls are provided with chain and sprocket connections 100 and 101 with the shafts of glue applying brushes 102 and 103, Figure 10.

The paper strip 26 for insertion between the spread rows of matches is pulled forward intermittently by the corrugating rolls 95 and 96, advancing during the forward movement of the conveyor and resting while the conveyor rests.

At any suitable distance before they reach the corrugating rolls the paper strip presents a portion of its width between rolls 104 and 105 for coating with ignition materal 28. (Figs. 8, 9, 10, 11, 21).

The rolls 104 and 105 turn by reason of their frictional engagement with the advancing strip of paper and are maintained suitably coated with striking material by engagement with dip rolls 106 and 107 that dip into striking material 108 inside suitable pots 109 which are shown supported by feed-pipes 110, which carry the liquid striking material 28 from any suitable supply source, not shown.

As illustrated the dip rolls 106 and 107 turn by reason of frictional engagement with the applying rolls 104 and 105 and suitably coat the applying rolls with the striking material, the mechanism operating by the movement of the paper which takes place only during the advancing movements of the conveyor.

An optional modification of mechanism for applying ignition material to the intermediate strip of paper is shown in Figures 21 and 22 where the coating rolls 104 and 105 have been replaced by brushes 104′ and 105′ which are mounted upon the upper ends of shafts 111 and 112 that have sprocket chain connection at 113 and 114 with the shafts of the corrugating rolls as already described and have bevelled gear connection at 115 with the dip rolls 106 and 107.

As before the coating members, brushes instead of rolls, only move during the period of advancement of the paper; the paper, the corrugated rolls and the coating members moving and resting together.

During each advancing movement of the conveyor the match strip and intermediate strip of paper 26, for insertion between the rows of matches, are simultaneously advancing, respectively by the rolls 88 and 89, and the corrugating rolls 95 and 96.

When the conveyor comes to rest at the block position 116, Figures 9 to 12, the severed section of match strip has come to rest, with a lower portion of its width between the open jaws 71 and 72 of the block, as seen in Figures 13 and 19, the paper strip for assembly with the severed section of the match strip being not yet severed and between the corrugating rolls vertically above the match strip section.

When the conveyor comes to rest at the position 116 the movable jaw and knife members 72 and 73, Figure 19, move inward by reason of rotation of the suitably formed cam shaft 58, gripping the match strip against the stationary jaw member 71, the movable jaw 72 coming to rest upon the strip, while the knife proceeds onward to sever the continuous portion 33 from the match strip section.

It will be understood that the shaft 58 engaging and positioning the knife blade 75 of the individual blocks rotates continuously, suitably making one turn for each turn of the main shaft 38 and, therefore, one turn for each combined rest and movement cycle of a conveyor block, and the cam surface of the shaft varies with respect to its radial distance from the shaft both longitudinally and circumferentially of the shaft in a way to provide the knife 73 and cooperating jaw 72 which has a lost motion connection with the knife with the desired movements. Suitably these movements include an initial closing of the jaw upon the shank ends of the match strip above the continuous strip joining the shank, this closing suitably taking place as the block comes to rest for the assembly of the matches with the corrugated paper. This is followed by a continuous inward movement of the knife to cut off the strip from the separate shanks and then during the downward movement of the corrugated paper there is a retraction and advance of the knife head to obtain momentary release of the jaw in order to permit the lower ends of the individual matches to spread apart to accommodate the corrugated strip, thereby preventing fanning.

The cam on the shaft 58 is desirably given a conformation such that during the rest period of the conveyor the knife effects cutting and then partially retracts the jaw member, maintaining continuous gripping.

The conveyor now carries the severed and gripped matches to the next rest position 117, the corrugating rolls correspondingly advancing the paper strip which is still held at its rearward end by the corrugating rolls at the beginning of the rest period at 117.

The strip of corrugated paper 118 for insertion between the spread rows of matches is held at its rearward end by the corrugating rolls 95 and 96 when the conveyor first comes to rest, after which it is first gripped at its upper edge near opposite ends thereof by the spaced jaws 119 and 120 of a placement tong 121 and then severed at its rearward end from the continuous strip.

The cutting is effected in any suitable way from a cam 45 on the main shaft 38.

As illustrated a bar 122 operatively connected to the cutting blade 123 is spring pressed at 124 toward cutting position, and is adapted to longitudinally slide in a guide 125 and is permitted to effect a spring cutting movement by reason of a suitable radial step in the cam 45.

The upper edge of the paper strip is clamped by the jaws of the tong 121, the gripping engagement being effected preferably at the beginning of the rest period and during the gripping and severing of the paper strip section, the rows of alternate matches are spread for easy entry of the paper strip.

The tong mechanism for gripping and placing the paper strip between the spread rows of matches is shown in Figures 8, 9 and 14.

The intermediate strip, preferably cut as soon as the grippers have taken hold of the upper edge of the strip, is held vertically above the matches by the tong.

During the gripping and severing of the paper, strip spreader members 126 and 127 move inward to spread the rows of alternate matches to the position seen in Figures 2, 10 and 14.

The spreader members (Figures 9, 10, 12 and 14) comprise rockers pivoted at 128 to stationary supporting structure 63 on opposite sides of the conveyor, each having spaced upward arms 129 supporting a connecting piece 130 that presents fingers 131 toward the matches, the fingers of one rocker being staggered with respect to those of one member coming intermittent the fingers of the other.

Each rocker is spring pressed toward its retracted or open position by a spring 132 surrounding the pivot pin 128 and suitably connected to the rocker and stationary structure.

The rockers are pushed inward against the outward retraction of the springs by suitable secondary rockers 133 pivoted at 134 on opposite sides of the conveyor.

The rockers 133 at one end engage suitable cams 135 (Figures 12 and 14) on the transverse shaft 51, and at the opposite end present beveled arms 136 against downward arms 137 of the spreader members.

The rockers 133 are resiliently maintained against the cam by a suitable spring 138 (Figure 12).

The cams 135 being given a conformation adapting them to move the spreaders to present their fingers in spreading position preparatory to and during the placement of the paper strip between the spread rows of matches, which are held at their shank ends between the jaws 71 and 72.

The corrugated strip is now moved downward to a position between the rows of matches, coming to rest upon the two rows of fingers 131 of the spreaders.

Preferably the jaw member 72 opens and releases the lower ends of the matches a little before the full insertion of the intermediate strip in order to permit a spreading apart of the lower ends of the matches to conform with the spacing between the head ends thereof.

When the corrugated strip has been placed by the tongs in the position of Figure 14 where it rests upon the fingers of the spreader, the jaw tong opens and retracts upwardly to a position to receive the next strip of paper while the jaw member 72 at the shank ends of the matches again tightens its hold upon the shanks of the matches which should be now substantially parallel, somewhat spread apart from their original spacing at both top and bottom, due to the insertion of the corrugated strip of paper 26.

It will be understood that the necessity for spreading the matches at the bottom is incident to the insertion of the intermediate strip which spreads the head ends of the matches incident to its winding back and forth between the matches, spreading of the shank ends prevents the "fanning" of the match heads outwardly from the shank ends which is undesirable from the standpoint of commercial appearance and ease of withdrawal from the finished pack.

The construction of the tong 121 for placing the intermediate strip between the spread rows of matches is best seen in Figures 8, 9 and 14.

The extent of opening or closure of the pincher type of jaws pivoted together at 139 is determined by the position of the tong with respect to a vertically movable guide 140; pins 141 and 142 in the ends of the upwardly directed arms of the tong fitting in slots 143 and 144 of the guide.

The guide 140 has a small range of vertical movement within stationary guiding structure 145.

A rocker 146 horizontally pivoted at 147 has a slot and pin connection at one end with the tong end and at the other end with the upper end of a rod 148 that is vertically slidable in a guide 149 and is vertically positioned by the cam 47 to suitably vertically position the tong.

The cam 46 swings the tong from the high position shown in dot-and-dash (Figure 14) to a low position corresponding to that shown in full line, Figure 14.

The upper arms of the tong are shown spring pressed apart at 150 although this is not essential in that the members are angularly positioned by the relative positions of the cam slots 143 and 144.

The cam slots 143 and 144 are further apart for short distances at top and bottom, at 151 and 152, the tong being open when positioned by these portions of the slots.

When the corrugated paper strip 26 first comes into the position for placement between the spaced rows of matches, the tong is in its raised position with the pin ends 141 and 142 of the tong in the upper spread portions 151 of the cam slots with the result that the jaws are open.

When the conveyor and strip comes to rest, the strip is presenting its upper edge between the open jaws of the tong which are then closed by a short upward movement of the slotted guide 140 which slides along the pins 141 and 142 forcing them toward one another to close the jaws upon the intermediate strip.

The variant vertical positioning of the guide 140 is effected by a lever 153, link 154 and the cam 47 (Figures 8 and 14).

The cams 46 and 47 are rigidly fastened to the main drive shaft 38 and engage rollers 155 and 156 on the lower end of the links 148 and 154 that vertically position the tong and guide members.

The tongs close after the paper comes to rest by reason of the roller 156 coming to a step 157 of the cam 47, which lifts the guide and results in a firm gripping of the upper edge of the strip.

The roller 155 on the lower end of the link 148 is now forced upward against the action of a suitable spring by the surface 158 of the cam 46, the tongs moving downward along the intermediate portion of the slots 143 and 144 to a position to present the strip between the spread rows of matches.

Preferably a little before the tongs have reached the limit of their downward travel they open incident to the pins 141 and 142 coming to the lower divergent portions of the cam slots, the guide member 140 being retracted downwardly during the downward travel of the tongs.

After placing the corrugated strip upon the spreader fingers 131 and opening its jaws the tongs are raised and kept open until they have cleared the strip by suitable simultaneous upward movement of the guide member 140.

The spread of the matches is perhaps exaggerated in Figure 14. Actually they are maintained from undue spreading by suitable guiding strips at each side of the strip of matches.

After the corrugated strip has been inserted between the rows of matches and the shank ends of the matches have been again gripped by tightening of the block jaw 72, incident to proper conformation of the cam shaft 58, the conveyor again starts to its next position and during this movement glue is applied upon the opposite sides of the corrugated strip intermediate the matches.

This application of glue may be effected in any suitable way or under certain circumstances as when the striking material is sufficiently adhesive may be omitted altogether.

The purpose of the glue is to maintain closer contact between the cover, not yet applied to the packet and the corrugated strip along the individual corrugations in order to insure suitably vigorous engagement between the match heads and the striking material during match withdrawal.

The glue is illustrated as applied by rotary brushes, Figures 8, 9, 10, 12 and 15.

The rotary brushes 102 and 103 are mounted at the lower end of shafts 159 which have sprocket chain connections at 100 and 101 with the lower ends of the shafts of the corrugating rolls 95 and 96, all rotated during the travel of the conveyor and stationary at other times.

Glue pots 160 are provided with lower extensions 161 of relatively reduced diameter and which are slotted at 162 toward the brushes, the slots being so narrow as to permit merely a very small seepage of glue.

The brushes successively pick up small loads of glue from these slots and present them against the corrugated strip intermediate the matches giving each outermost portion of the strip a small coating of glue upon opposite sides thereof.

The rest period after gluing is merely one of waiting before an advancement to the next position and optionally the period of waiting may be increased by providing any desired number of conveyor positions before the application of the cover which takes place at position 163.

When the packet comes to rest in the position 163 the shank ends of the matches are held between the jaws 71 and 72 on the conveyor block, the matches are in corrugations upon opposite sides of the paper strip, and the corrugated paper strip has been coated with striking material along its lower edge and also with glue intermediate the matches from some distance upward from the lower edge, the glue optionally being omitted in the event that the striking material has sufficient adhesive properties.

Before or immediately after the packet is brought to rest in position to receive the cover (Figure 16) a cover blank 164 is moved to position to use for covering the packet.

The cover blanks 27, cut to size and scored for easy bending at 34, 35 and 36, are fed from a suitable hopper 165.

In this hopper the blanks are held in a vertical position with the score lines horizontal and are spring pressed at 166 toward a front plate 167, Figure 16.

Across the bottom of the hopper adjacent the plate 167 is a slot 168 of width greater than that needed to pass a single blank but too narrow to permit passage of more than one blank at a time.

A little below the slot 168 we provide rolls 49 and 49' one of which is adapted to rotate continuously in any suitable way, being shown with a sprocket drive at 169 from a shaft 170 that has in turn a sprocket chain drive at 171 from the sprocket 48' on the main cam shaft (Figures 8, 9 and 20).

In order to feed the blanks from the reservoir 165 to the rolls 49 and 49' a suitable rocker 172 is provided, pivoted at 173 and angularly reciprocated by suitable operating connection with the cam 52.

The end of the rocker presents a spring finger 174 against the front of the front wrapper (Figures 16 and 20) through a slot 175 through stationary plate 167.

When the rocker carries the finger downwardly it pushes the front wrap down, the lower edge of the wrap passing through the slot 168 to be taken hold of by the rolls 49 and 49' which deliver it by the aid of a suitable guide 177 to the position of the wrap 164 (Figure 16).

When the rocker 172 retracts the spring finger 174 slides up over the front of the forward wrap to position for feeding the next wrap.

The blank should be placed in the position of 164, Figure 16, either before or soon after the coming to rest of the conveyor and of the partially completed packet 176 about to receive the wrap.

After the packet comes to rest and the wrap has been placed to the position shown in Figure 16, the upward extending portion is turned down over a metal guide strip 178, the score line 35 on the wrap providing easy and complete bending.

The bending along the score line 35 is effected by a horizontal plunger 55, Figure 16, which is moved forward by a suitable rocker member 180 (Figure 20) that has pin and slot connection 181 with the plunger, is pivoted at 182 and has its lower end engaging and positioned by the cam 53 on the main drive shaft.

After the advancement of the plunger 55 with the turning over of the upwardly projecting portion of the wrap a vertical plunger 56 moves downward and turns the wrap at the score line 36 over the forward edge of the guide as best seen in Figure 20.

The plunger 56 is vertically reciprocated by any suitable means illustrated as by a rocker member 184 pivoted at 185 presenting a roller 186 to the cam 54 upon the main cam shaft and making link connection at 187 with the plunger, the rocker being spring pressed against the cam by a suitable spring 188.

The vertical plunger 56 may desirably extend only across the middle portion of the wrap leaving space at the sides of the plunger for stapling.

Optionally the portion of the plunger that is sufficiently high to be out of the way of the stapling mechanism may be given a width as great as that needed to extend all the way across the wrap.

The plunger 56 preferably remains in its low position, that of Figure 20 during stapling, the stapling plungers moving inward upon each side of the vertical plunger to effect stapling.

Any suitable stapler may be used that is adapted to insert the staples simultaneously on the opposite sides of the packet, and the illustration of the stapler is intended to be in some respects a conventional one for any suitable stapler.

As shown the transverse shaft 51 that operates the match spreading mechanism, Figure 12, carries a drum 189, Figures 8, 9, 10, 12 and 20 which is provided with a suitable endless cam slot 190 for effecting the stapling stroke.

The stapling plunger 191 is operated by a rocker member 192 which is pivoted at 193 and has a lower arm presenting a roller 194 into the cam slot 190, Figure 20 and an upper arm making slot and pin connection at 195 with the plunger, (Figure 16).

The plunger 191 is inside a secondary or follower plunger 196, the two plungers being provided with a longitudinally resilient connection at 197 adapting the outer plunger to follow the inner or first plunger during the rearward portion of the stroke and to present its forward end as a presser face against the turned down face of the wrap adjacent the blade portions 198 of the stapler plunger if desired, the stapler blades 198 operating through slots in the forward end of the secondary plunger.

The staples are carried in suitable feed magazines at 199 of a usual type in which the staples in each magazine are spring pressed side by side to the inner end of a suitable guide with the staple tines presented toward the packet, the stapler blade having a path registering with the position of the innermost staple when the plunger is retracted.

During each forward stroke of the rocker the two plungers move forward together until the outer plunger is stopped at the forward end of its stroke by engaging a suitable stop, optionally by an engagement of its front end with the side of the turn down plunger 183.

The inner plunger continues onward after the outer plunger comes to rest, the stapler blades sweeping the innermost staples along the guiding slots through the forward ends of the outer plunger to effect stapling.

The retraction may desirably be delayed until near the end of the conveyor rest period.

During all this time the individual matches have been held by their shank ends and one feature of the invention is directed to the roughening of the shank ends of the matches, secured by suitably serrating the faces of the jaws 71 and 72.

When finished, the packet may be delivered into a suitable guideway at 200 for boxing the packet—or less desirably, may be permitted to fall into a suitable receptacle at the end of the conveyor.

In view of our invention and disclosure variations and modifications to meet individual whim or particular need will doubtless become evident to others skilled in the art, to obtain all or part of the benefits of our invention without copying the structure shown, and we, therefore, claim all such in so far as they fall within the reasonable spirit and scope of our invention.

Having thus described our invention, what we claim as new and desire to secure by Letters Patent is:—

1. In mechanism of the character indicated, an intermittent conveyor comprising a chain of blocks, a longitudinal jaw on each block spring pressing toward open position, a second jaw cooperating with the first and adapted to support the spring closure of the first, the jaws in open position being adapted to receive between them the downwardly directed shank-end side of a match strip, and means for resiliently closing the first jaw upon an inserted match strip.

2. In mechanism of the character indicated, an intermittent conveyor comprising a chain of blocks, a laterally movable knife on each block having a longitudinal cutting edge directed transversely inwardly across the top of the block, a jaw mounted on the knife and having a longitudinal transversely inwardly directed face, a spring pressing the knife and jaw outwardly, a second jaw parallel to the first and inwardly thereof, and cam means outside the conveyor for moving the knife and jaw inward to cutting and closure positions.

3. In mechanism of the character indicated, an intermittent conveyor comprising a chain of blocks, a laterally movable knife on each block having a longitudinal cutting edge directed transversely inwardly across the top of the block, a jaw mounted on the knife and having a longitudinal transversely inwardly directed face, a spring pressing the knife and jaw outwardly, a second jaw parallel to the first and inwardly thereof, a continuously rotating cam outside the conveyor and an operative connection between the cam and knife.

4. In mechanism of the character indicated, an intermittent conveyor comprising a chain of blocks, a laterally movable knife on each block having a longitudinal cutting edge directed transversely inwardly across the top of the block, a jaw transversely movably mounted on the knife and having a longitudinal transversely inwardly directed face, spring connection between the jaw and knife pressing the jaw inwardly with respect to the knife, a slot and pin connection between the jaw and knife limiting the inward position of the jaw with respect to the knife, a spring connection between the knife and block pressing the knife outwardly, a second jaw parallel to the first and cam means outside the conveyor for moving the knife inward to effect cutting, the inward movement of the knife carrying the first jaw inward to a resilient closure against the second jaw.

5. In mechanism of the character indicated, an intermittent conveyor comprising a chain of blocks, a laterally movable knife on each block having a longitudinal cutting edge directed transversely inwardly across the top of the block, a jaw transversely movably mounted on the knife and having a longitudinal transversely inwardly directed face, spring connection between the jaw and knife pressing the jaw inwardly with respect to the knife, a slot and pin connection between the jaw and knife limiting the inward position of the jaw with respect to the knife, a spring connection between the knife and block pressing the knife outwardly, a second jaw parallel to the first and cam means outside the conveyor for moving the knife inward to effect cutting, the inward movement of the knife carrying the first jaw inward to a resilient closure against the second jaw, the block having a longitudinal recess between the jaws adapted to receive the continuously connected portion of a match strip, the knife being positioned higher than the recess and adapted to cut the match strip longitudinally above the continuously connected portion thereof, thereby separating the matches from one another.

6. In mechanism of the character indicated, an intermittent conveyor comprising a chain of blocks, a longitudinal jaw on each block spring pressing toward open position, a second jaw cooperating with the first and adapted to support the spring closure of the first and intended roughenings on the engaging surfaces of the jaws, the jaws in open position being adapted to receive between them the shank-end side of a strip of paper shank matches, and means for resiliently closing the first jaw upon an inserted match strip, the roughened jaw surface effecting a roughening of the clamped match shank surfaces.

7. In mechanism of the character indicated, a pair of laterally adjacent corrugating rolls, the corrugations of one roll mating with those of the other, an intermittent conveyor for presenting match strip sections in successive positions, operative connections between the conveyor and rolls adapting the rolls to operate during the operation of the conveyor and to remain at rest during the rest periods of the conveyor, said rolls being adapted to corrugate a strip of paper for assembly with the match strip sections, said strip passing between the rolls, and a pair of cooperating applying rolls spaced from the corrugating rolls adapted to resiliently engage and apply ignition material to opposite sides of the said strip on its way to the corrugating rolls.

8. In mechanism of the character indicated ed, a pair of laterally adjacent corrugating rolls, the corrugations of one roll mating with those of the other, an intermittent conveyor for presenting match strip sections in successive positions for successive stages of manufacture of a match packet, operative connections between the conveyor and rolls adapting the rolls to operate during the operation of the conveyor and to remain at rest during the rest periods of the conveyor, said rolls being adapted to corrugate and forwardly feed a strip of paper for assembly with the match strip section and passing between the rolls, a pair of cooperating applying rolls spaced from the corrugating rolls adapted to resiliently engage opposite sides of the said strip on its way to the corrugating rolls, a reservoir containing ignition material, and dip rolls having high points in frictional engagement with the circumferential faces of the respective applying rolls and low points dipping into ignition material, the turning of the corrugating rolls effected by the movement of the conveyor effecting a frictional turning of the applying rolls which in turn effects a frictional turning of the dip rolls, thereby securing a transfer of ignition material from a reservoir into which the dip rolls dip to the opposite sides of the strip.

9. In mechanism of the character indicated, a pair of vertical rolls for simultaneously applying ignition material to opposite sides of a strip of paper passing between the rolls, horizontal dip rolls having oppositely directed vertical ends respectively engaging the circumferential faces of the applying rolls, means for presenting ignition material to the lower portions of the dip rolls and means for simultaneously moving the paper and rotating the rolls.

10. In mechanism of the character indicated, means for presenting a strip of paper matches and a corrugated sheet having a width less than the length of the match shanks and said sheet being in substantially a common plane with the head ends of the matches directed toward and the matches substantially alined with the corrugations of the sheet, a spreader comprising two members one on each side of the strip of matches, each member having fingers directed transversely of the match strip at successive alternate matches thereof, the fingers of the member on one side being staggered with respect to those of the others, means for moving the spreaders transversely into the match strip so that the fingers engage and outwardly deflect the alternate matches in opposite directions, and means for moving the corrugated strip edgewise between the spread rows of alternate matches registering the corrugations with the matches.

11. In mechanism of the character indicated, an intermittent conveyor comprising a chain of blocks, a laterally movable knife on each block having a longitudinal cutting edge directed transversely inwardly across the top of the block, a jaw mounted on the knife and having a longitudinal transversely inwardly directed face, a second jaw parallel to the first and inwardly thereof, means adapting the cooperating jaws to receive and hold the shank-end side of a strip of paper shank matches in which the matches are separate from their head ends toward their shank ends and integrally connected together at their shank ends, means for operating the knife to sever the shank ends of the matches from connection together, means for spreading rows of alternate matches, means for inserting a strip of corrugated sheet material between the spread rows, means operative during the insertion of the corrugated sheet for releasing the hold upon the lower ends of the matches in order to adapt the matches to accommodate themselves longitudinally to the corrugations of the sheet and means for closing the jaws upon the lower ends of the matches after positioning the matches and corrugated sheet in relative registry.

12. In mechanism of the character indicated an intermittent conveyor comprising a chain of blocks, a laterally movable knife on each block having a longitudinal cutting edge directed transversely inwardly across the top of the block, a jaw transversely movably mounted on the knife and having longitudinally transversely inwardly directed face, a spring connection between the jaw and the knife pressing the jaw inwardly with respect to the knife, a slide and stop connection between the jaw and knife limiting the inward position of the jaw with respect to the knife, a spring connection between the knife and block pressing the knife outwardly, a second jaw parallel to the first, a continuously rotating shaft outside the conveyor having a cam face along the conveyor, operative connections between the cam face and the knife determining the inward position of the knife, means for positioning the shank-end side of a strip of paper shank matches between the jaws, the cam operating the knife to separate the individual matches by severing the continuous portion of the match strip from the individual shanks and resiliently closing the jaw, means for spreading the rows of alternate matches while holding the shank ends thereof between the jaws, and means for inserting a corrugated sheet between the spread rows, the cam operating to release the hold of the jaws upon the shank ends of the matches during the insertion of the corrugated strip in order to permit the matches to accommodate their position to fit in the corrugations of the sheet and then tightening the hold of the jaws upon the lower ends of the shanks.

13. In mechanism of the character indicated, a holder, means for presenting the shank-end side of a strip of paper shank matches to the holder so that the strip held along its shank-end side in the holder presents the matches head end outward preparatory to placing a corrugated sheet between the matches, a spreader comprising a row of fingers on each side of the holder and individually directed toward the individual alternate matches, the fingers on one side of the strip being staggered with respect to those on the other side thereof, means for operating the spreader to move the fingers into the matches, the fingers on one side deflecting alternate matches in one direction while the fingers on the other side deflect the remaining matches in the other direction, and means for inserting the corrugated sheet between the spread rows.

14. In mechanism of the character indicated, a holder, means for presenting the shank-end side of a strip of paper shank matches to the holder so that the strip held along its shank-end side in the holder presents the matches head end outward preparatory to placing a corrugated sheet between the matches, a spreader comprising a row of fingers on each side of the holder and individually directed toward the individual alternate matches, the fingers on one side of the strip being staggered with respect to those on the other side thereof, and means for operating the spreader to move the fingers into the matches, the fingers on one side deflecting alternate matches in one direction while the fingers on the other side deflect the remaining matches in the other direction, so that the fingers of one side overlap the fingers of the other side across the held portion of the strip in combination with means for placing the corrugated sheet upon the overlapping ends of the fingers using the fingers to support the inserted corrugated sheet for registering its position with respect to the matches.

15. In mechanism of the character indicated, a pair of cooperating jaws, means for placing a strip of paper shank matches so that the shank-end side thereof is between the jaws, and means for assembling a corrugated sheet with the matches of the strip, in combination with means for applying glue to the surface of the corrugated sheet at points intermediate the matches near the shank-end side thereof, and means for applying a cover over the assembled sheet and strip.

16. In mechanism of the character indicated, a pair of cooperating jaws, means for placing the shank-end side of a strip of paper matches between the jaws, and means for assembling a corrugated sheet with the matches of the strip, in combination with means for applying glue to the surface of the corrugated sheet at points intermediate the matches near the shank-end side thereof, including a glue pot spaced laterally from the work unit and laterally perforated toward the work unit along a portion of its length, and a rotary brush between the glue pot and work unit having circumferentially spaced sets of brush portions spaced in registry with the said corrugations, the brush being adapted to rotate during the forward movement of the paper strip with the brush portions successively engaging glue seeping from the lateral perforation and the said surfaces of the corrugated sheet, the simultaneous forward movement of the strip and rotation of the brushes adapting the brush sections to pick up glue seeping from the perforations and to apply it to the sheet at the said surfaces.

17. In mechanism of the character indicated, a pair of cooperating jaws, means for placing the shank-end side of a strip of paper shank matches between the jaws, and means for an assembling of the matches with a corrugated sheet, seating the match shanks on opposite sides of the sheet in the corrugations thereof, in combination with means for applying glue to the corrugated sheet at points intermediate the matches and toward the shank ends thereof, said means including a glue pot on each side of the work unit, each having a lateral seepage perforation along a portion of its length, and a rotary brush adapted to rotate during the forward movement of the assembled sheet and strip and having circumferentially spaced brush portions to register during said movement with glue seeping from the lateral perforations and later with the said points of the sheet, the simultaneous forward movement of the assembled sheet and strip and rotation of the brushes adapting the brush sections to pick up glue seeping from the perforations and to apply it to the sheet, there being two glue pots, each having a perforation adapting glue to seep out along a line to be engaged by the circumferentially spaced brush portions that engage the said surfaces of the corrugated sheet intermediate the matches and toward the shank-end edge thereof.

18. In mechanism of the character indicated, mechanism for holding a strip of paper shank matches by the shank-end side of the strip, means for spreading the rows of alternate matches and means for presenting a corrugated sheet having a width less than that of the length of the match shanks to a position directing the sheet edgewise toward the space between the spread rows in combination with means for moving the corrugated sheet to a position between the spaced rows, the said means including a pair of cooperating tong members pivoted one upon the other and having tong ends on one side of the pivot directed toward the space between the spaced rows and operating arms on the other side of the pivot directed away from the match strip, a rocker adapted to vertically position the tongs, a cam engaging one of the said operating arms during the variant vertical positioning of the tongs and adapted to determine the extent of relative opening and closure of the tongs by its vertical position with respect to the tongs, and mechanism for vertically reciprocating the rocker, the cooperating action of the cam closing the tongs upon the upper edge of the sheet and again opening the tongs after the sheet has been positioned between the spread matches.

19. In mechanism of the character indicated, mechanism for holding a strip of paper shank matches by the shank-end side of the strip, means for spreading the rows of alternate matches and means for presenting a corrugated sheet having a width less than that of the length of the match shanks to a position directing the sheet edgewise toward the space between the spread rows in combination with means for moving the corrugated sheet to a position between the spaced rows, the said means including a pair of cooperating tong members pivoted one upon the other and having tong ends on one side of the pivot directed toward the space between the spaced rows and operating arms on the other side of the pivot directed away from the match strip, a rocker adapted to vertically position the tongs, a cam member engaging the said operating arms during the variant vertical positioning of the tongs and adapted to determine the extent of relative opening and closure of the tongs by its vertical position with respect to the tongs, mechanism for vertically reciprocating the rocker, the cooperating action of the cam closing the tongs upon the upper edge of the sheet and again opening the tongs after the sheet has been positioned between the spread matches.

20. In mechanism of the character indicated, mechanism for holding a strip of paper shank matches by the shank-end side of the strip, means for spreading the rows of alternate matches and means for presenting a corrugated sheet having a width less than that of the length of the match shanks to a position directing the sheet edgewise toward the space between the spread rows in combination with means for moving the corrugated sheet to a position between the spaced rows, the said means including a pair of cooperating tong members pivoted one upon the other and having tong ends on one side of the pivot directed toward the space between the spaced rows and operating arms on the other side of the pivot directed away from the match strip, a rocker adapted to vertically position the tongs, a cam engaging one of the said operating arms and adapted to determine the extent of relative opening and closure of the tongs by its vertical position with respect to the tongs, mechanism for vertically reciprocating the rocker, the cooperating action of the cam closing the rocker to the tongs upon the upper edge of the sheet and again opening the tongs after the sheet has been positioned between the spread matches, and mechanism for varying the vertical position of the cam in order to delay the closure of the tongs during its upward retraction.

21. In mechanism of the character indicated, mechanism for holding a strip of paper shank matches by the shank-end side of the strip, means for spreading the rows of alternate matches and means for presenting a corrugated sheet having a width less than that of the length of the match shanks to a position directing the sheet edgewise toward the space between the spread rows in combination with means for moving the corrugated sheet to a position between the spaced rows, the said means including a pair of cooperating tong members pivoted one upon the other and having tong ends on one side of the pivot directed toward the space between the spaced rows and operating arms on the other side of the pivot directed away from the match strip, a rocker adapted to vertically position the tongs, a cam engaging one of the said operating arms and adapted to determine the extent of relative opening and closure of the tongs by its vertical position with respect to the tongs, mechanism for vertically reciprocating the rocker, the cooperating action of the cam closing the tongs upon the upper edge of the sheet, means for again opening the tongs after the sheet has been positioned between the spread matches, and mechanism for varying the vertical position of the cam in order to close the tong before it begins its downward stroke and to keep the tong open during the retraction of the tong from between the spaced rows.

22. In mechanism of the character indicated, means for delivering a partially formed match packet including paper shank matches and a corrugated sheet having a width less than the length of the match shanks, both sides of the sheet seating the matches in the corrugations thereof, and said means including a holder holding the partially formed matches by the shank ends of the matches and presenting the match-head side of the packet upwardly in combination with a stationary forming plate along and across the match head edge of the packet and having opposite edges respectively substantially in the planes of the opposite sides of the packet, means for delivering a cover blank having score lines adapted to register with the said side edges to a position in which the blank has a lower portion covering one side of the partially formed packet, a first score line registering with the inside edge of said forming plate, and an upper flap above the score line, a horizontal plunger and a vertical plunger in position respectively to move horizontally across the edge of the packet above the plate to turn the flap down on the plate, and vertically downward outwardly adjacent the outer edges of the plate to turn the flap folded horizontally downward by the first plunger down upon the other side of the packet, means for successively operating the plungers, and means for fastening the folded cover to place upon the packet.

23. In mechanism of the character indicated, means for delivering a partially formed match packet including paper shank matches and a corrugated sheet having a width less than the length of the match shanks, both sides of the sheet seating the matches in the corrugations thereof and said means including a holder holding the partially formed matches by the shank ends of the matches and presenting the match-head side of the packet upwardly in combination with a stationary forming plate across the match head edge of the packet along the length thereof having opposite edges respectively in the planes of the opposite sides of the packet, means for delivering a cover blank having score lines adapted to register with the said side edges of the plate to a position in which the blank has a lower portion covering one side of the partially formed packet and a first score line registering with the inside edge of said forming plate and an upper flap above the first score line, a horizontal plunger and a vertical plunger in position respectively to move horizontally across the upper edge of the packet above the forming plate to turn the flap down on to the plate and vertically downward outwardly adjacent the outer edge of the plate, means for successively operating the plungers.

24. In mechanism of the character indicated, means for delivering a partially formed match packet including paper shank matches and a corrugated sheet having a width less than the length of the match shanks, both sides of the sheet seating the matches in the corrugations thereof and said means including a holder holding the partially formed matches by the shank ends of the matches and presenting the match-head side of the packet upwardly in combination with a stationary forming plate across the match-head edge of the packet along the length thereof having opposite edges respectively in the planes of the opposite sides of the packet, means for delivering a cover blank having score lines adapted to register with the said side edges of the plate to a position in which the blank has a lower portion covering one side of the partially formed packet and a first score line registering with the inside edge of said forming plate and an upper flap above the first score line, a horizontal plunger and a vertical plunger in position respectively to move horizontally across the upper edge of the packet above the forming plate to turn the flap down on to the plate and vertically downward outwardly adjacent the outer edge of the plate, means for successively operating the plungers and a stapler adapted to staple opposite sides of the packet to hold the cover to place.

25. In mechanism of the character indicated, means for delivering a partially formed packet having paper shank matches and a corrugated sheet of width less than that of the match shanks both sides of the sheet seating matches in the corrugations thereof, and said means including a holder holding the partially formed packet by the shank ends of the matches, in combination with a stationary forming plate across the match-head edge of the packet, a pair of feed rolls for feeding a cover and blank and having a line between the rolls of substantial engagement in substantially the plane of one side of the partially formed packet at one edge of the forming plate, a guide adapted to receive a cover blank from between the rolls and to position it to register a lower portion against one side of the packet and against the forming plate with a score line of the blank at the edge of said plate, means for delivering a blank to the rolls for subsequent delivery to the guide, and means for folding the upper portion of the delivered wrap over the forming strip and down over the side packet away from the guide and means for fastening the cover blank to place.

26. In mechanism of the character indicated, means for progressing paper matches separated at the head ends and still connected with a shank of the strip, means for simultaneously progressing a partition strip therefor, spot-applying mechanism for intermittently applying ignition material to the partition strip in such position as to register with the crowns of the corrugations to be formed, means for corrugating the partition strip and for introducing it endwise of the matches, means for separating the matches from the shank strip and means for encasing the separated matches and corrugated partition material in a card cover.

27. In mechanism of the character indicated, means for advancing a strip of paper matches attached to a shank strip from which they have been partially cut, means for correspondingly advancing a partition strip, means for applying ignition material to the partitioning strip, corrugating means for bending the partition strip, means for cutting the match strip and the corrugated partition strip into lengths corresponding with the widths of intended packages, means for spreading the heads of the matches, means for introducing the corrugated strip between the matches in the direction of the length of the matches and means for cutting the matches free from their strip.

28. In mechanism of the character indicated, holding mechanism for holding a strip of paper matches attached to a shank base and long enough for the width of a match package, means for spreading the heads of the matches, means for presenting a corrugated strip of material along the lengths of the corrugations in line with the lengths of the matches, feeding means for moving the corrugated material lengthwise of the match heads to partition the matches, and cutting mechanism for severing the matches from their shank base.

29. The method of packaging matches having heads and shanks connected with a continuous strip, which consists in feeding the strips of matches transversely, in concurrently feeding a partition strip lying in substantially the same plane as the strip of matches, in corrugating the partition strip, in cutting the strip material and the corrugated material into lengths corresponding with a package width, in partially spreading the matches at their head ends, in feeding the corrugated strip between the spread match heads lengthwise of the matches, and in separating the matches from the strip with which they are connected.

30. The method of packaging matches having heads and shanks connected with a continuous strip, which consists in feeding the strips of matches transversely, in concurrently feeding a partition strip lying in substantially the same plane as the strip of matches, in applying ignition material to the partition strip, in corrugating the partition strip, in cutting the strip material and the corrugated material into lengths corresponding to the lengths of intended packages, in partially spreading the matches at their head ends, in feeding the corrugated strip between the spread match heads lengthwise of the matches, in separating the matches from the strip with which they are connected, and in encasing the matches and corrugated material.

31. The method of packaging matches having heads and shanks connected with a continuous strip, which consists in feeding the strips of matches transversely, intermittently, and suitably supported in concurrently feeding a partition lying in substantially the same plane as the strip of matches, in applying ignition material to the partition strip, in corrugating the partition strip, in cutting the strip material and the corrugated material into lengths corresponding with a package, in partially spreading the matches at their head ends, in feeding the corrugated strip between the spread match heads lengthwise of the matches, in separating the matches from the strip with which they are connected, and in encasing the matches and corrugated strip.

32. The method of packaging matches having heads and shanks connected with a continuous strip, which consists in feeding the match strip transversely, in concurrently feeding a partition strip lying in substantially the same plane as the strip of matches, in applying ignition material to the partition strip, in corrugating the partition strip, in cutting the match strip and the corrugated partition strip into lengths corresponding with the lengths of an intended package, in partially spreading the matches at their head ends, in feeding the corrugated strip between the spread match heads lengthwise of the matches, in separating the matches from the strip with which they are connected, in applying glue to the outer faces of the bends of the corrugated material, and in encasing the matches and corrugated strip.

33. The method of packaging matches having heads and shanks connected with a continuous strip, which consists in feeding the match strip transversely, in concurrently feeding a partition strip lying in substantially the same plane as the strip of matches, in applying ignition material to the partition strip, in corrugating the partition strip, in cutting the match strip and the corrugated partition strip into lengths corresponding with the lengths of an intended package, in partially spreading the matches at their head ends, in feeding the corrugated strip between the spread match heads lengthwise of the matches, in separating the matches from the strip with which they are connected, in applying glue to the outer faces of the bends of the corrugated material, in encasing the matches, and corrugated strip and in stapling the edges of the casing.

RALPH H. GAMBLE.
WILLIAM J. CROWELL, Jr.